United States Patent
Callahan et al.

(10) Patent No.: US 10,006,566 B2
(45) Date of Patent: Jun. 26, 2018

(54) AIR TIGHT SEALING SUPPORT CLIP FOR ATTACHING FLUID-CARRYING TUBE TO SUBSTRATE

(71) Applicant: Ford Global Technologies, LLC, Dearborn, MI (US)

(72) Inventors: Janet Callahan, Troy, MI (US); Scott Cutler, Canton, MI (US); Michael Clark, Wolverine Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 134 days.

(21) Appl. No.: 15/056,021

(22) Filed: Feb. 29, 2016

(65) Prior Publication Data
US 2017/0247001 A1    Aug. 31, 2017

(51) Int. Cl.
| F16L 3/22 | (2006.01) |
| F16L 3/237 | (2006.01) |
| F16L 58/00 | (2006.01) |
| F16L 3/10 | (2006.01) |

(52) U.S. Cl.
CPC ............ *F16L 3/237* (2013.01); *F16L 3/1091* (2013.01); *F16L 58/00* (2013.01)

(58) Field of Classification Search
CPC .................................................... F16L 3/2235
See application file for complete search history.

(56) References Cited

U.S. PATENT DOCUMENTS

| 5,234,185 A | | 8/1993 | Hoffman et al. |
| 5,547,152 A | * | 8/1996 | Krock .................. F16L 3/1008 |
| | | | 24/274 WB |
| 5,568,584 A | * | 10/1996 | Smith .................. G02B 6/4446 |
| | | | 385/134 |
| 7,464,966 B2 | | 12/2008 | Miyajima et al. |
| 7,579,556 B2 | | 8/2009 | Tapper |
| 8,281,457 B2 | | 10/2012 | Schupska |
| 2012/0153095 A1 | * | 6/2012 | Child .................... F16L 3/2235 |
| | | | 248/68.1 |

FOREIGN PATENT DOCUMENTS

| CN | 203215083 | 9/2013 |
| EP | 1544532 | 6/2005 |
| KR | 20050032222 | 4/2005 |

* cited by examiner

*Primary Examiner* — Amy J. Sterling
(74) *Attorney, Agent, or Firm* — LeClairRyan

(57) ABSTRACT

A support clip for attaching a fluid-carrying tube or line to a substrate is disclosed that provides an air tight seal on a single fluid-carrying tube or line or on multiple fluid-carrying tubes or lines when the tubes are secured between two different surfaces. The support clip has two mated elastomeric surfaces defined by upper and lower halves that account for minor surface-to-surface variations while still maintaining an air tight seal. The lower half is attached to a vehicle substrate by a locating anchor. Each half has a rigid body and an elastomeric portion. The rigid body maintains the form of the elastomeric portion. At least one tube-holding channel is formed in the elastomeric portion of each half. When the two halves are fastened together by an interference fit, the air tight seal is established. The halves may be fastened together by a variety of mechanical arrangements.

18 Claims, 4 Drawing Sheets

US 10,006,566 B2

AIR TIGHT SEALING SUPPORT CLIP FOR ATTACHING FLUID-CARRYING TUBE TO SUBSTRATE

TECHNICAL FIELD

The disclosed inventive concept relates to support clips for attaching fluid-carrying lines or fluid-carrying tubes to a substrate. More particularly, the disclosed inventive concept relates to a support clip for attaching fluid-carrying lines or fluid-carrying tubes to a substrate such as a vehicle body in which an air tight seal is formed around the lines or tubes. The support clip includes two portions clamped together wherein the line or tube is captured therebetween.

BACKGROUND OF THE INVENTION

Automotive vehicles rely on a series of fluid-carrying tubes or lines to communicate fluid from one point to another. Specific systems that rely on fluid-carrying tubes or lines include brake and fuel systems. To fulfill all operational demands of carrying such chemically-reactive fluids under high pressure, such tubes or lines are typically composed of a durable, chemical-resistant and pressure-resistant metal, such as steel.

While steel fluid-carrying tubes or lines satisfy operational demands of the vehicle, mounting these conduits to the vehicle substrate can be difficult. On the one hand, the tubes should be spaced-apart from the substrate using support brackets so as to prevent undesirable NVH and to minimize corrosion. On the other hand, support brackets often lead to metal corrosion at the point of contact as water and, in certain driving conditions, road salt tend to accumulate at the point of contact, leading to leakage caused by corrosion that results in early system failure.

Accordingly, known approaches to attaching a fluid-carrying tube or line to the substructure of a vehicle have not produced satisfactory results. As in so many areas of vehicle technology, there is always room for improvement related to systems that convey fluids in the automotive vehicle.

SUMMARY OF THE INVENTION

The disclosed inventive concept provides a support clip that overcomes the problems of known methods of attaching a fluid-carrying tube or line to a substrate. The support clip provides an air tight seal on a single fluid-carrying tube or line or on multiple fluid-carrying tubes or lines when the tubes are secured between two different surfaces. The support clip has two mated elastomeric surfaces that account for minor surface-to-surface variations while still maintaining an air tight seal. This seal prevents the introduction of water or road salt between the support structure and the fluid-carrying tube or line, thus avoiding corrosion of the tube or line that would otherwise result and, simultaneously, avoiding possible system failure.

The support clip includes a lower half and an upper half. The lower half is attached to a substrate in a vehicle by a locating anchor. Each half has a rigid body and an elastomeric portion. The rigid body maintains the form of the elastomeric portion. One or more tube-holding channel is formed in the elastomeric portion of each of the lower half and the upper half. When the two halves are fastened together by an interference fit, the air tight seal is established.

Fastening of the upper half to the lower half may be accomplished by a variety of mechanical attachments. A preferred but not limiting method of attachment includes clasps formed on one or the other of the upper half and the lower half and clasp receptacles formed on the other of the upper half and the lower half.

Variations of the disclosed inventive concept include the provision of an optional metal insert in one or both of the rigid bodies. Another variation includes providing a hinge between the upper half and the lower half.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
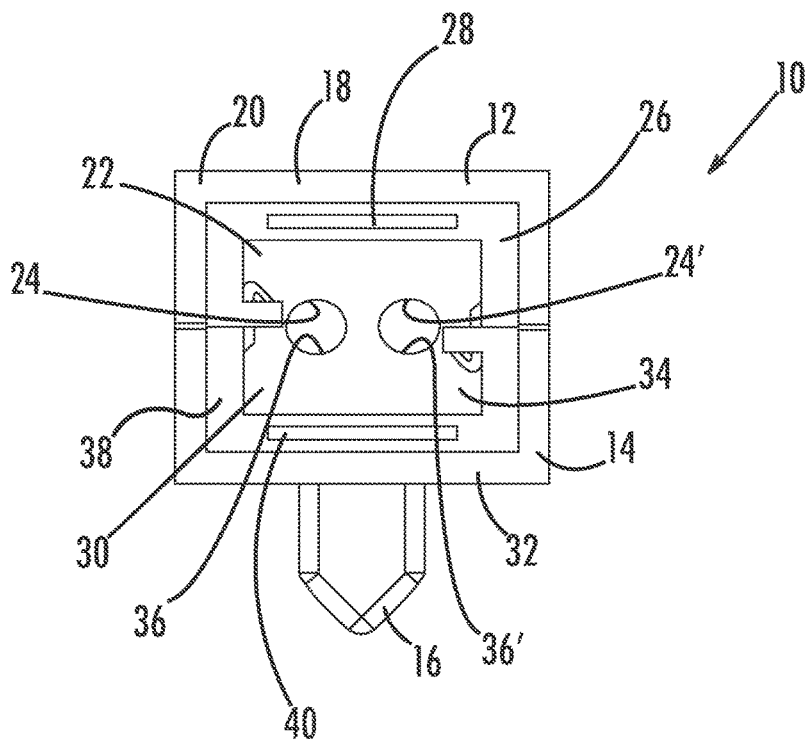
FIG. 1 is a front view of a support clip according to the disclosed inventive concept in which the two halves are clamped together.

In the following figures, the same reference numerals will be used to refer to the same components. In the following description, various operating parameters and components are described for different constructed embodiments. These specific parameters and components are included as examples and are not meant to be limiting.

Figure 6:
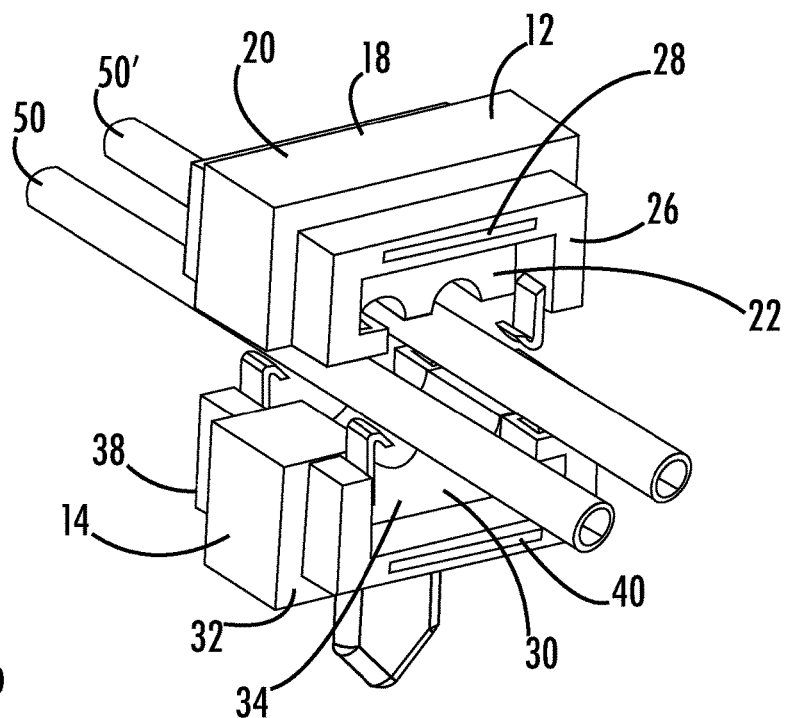
FIG. 6 is a perspective view of a support clip according to the disclosed inventive concept in which the two halves are separated in which fluid lines are shown in relation to the two halves.
Figure 7:
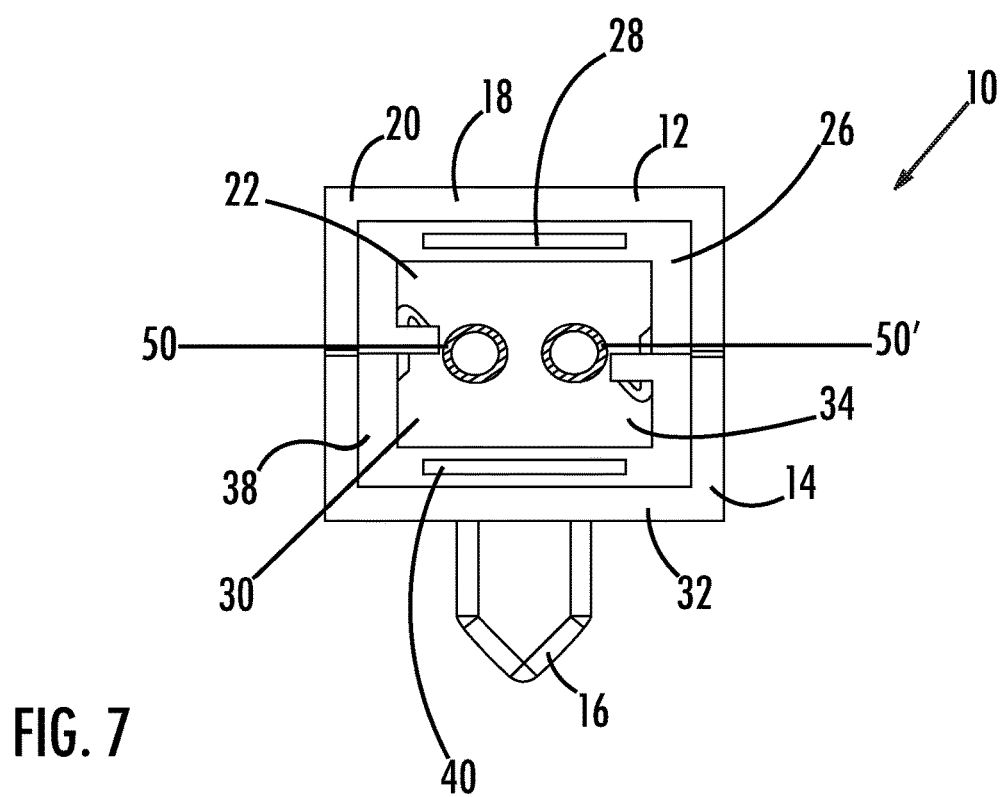
FIG. 7 is a front view of a support clip according to the disclosed inventive concept in which the two halves are clamped together that illustrates tubes that are constrained by the two halves.

The accompanying figures and the associated description illustrate the support clip according to the disclosed inventive concept in which the support clip is illustrated in both its assembled configuration as well as its exploded configuration. In addition, FIGS. 1 through 5 illustrate both the assembled and exploded support clip without the captured fluid-carrying tubes while FIGS. 6 and 7 illustrate the fluid-carrying tubes captured between the two portions of the support clip. It is to be understood that the shape and number of captured fluid-carrying tubes illustrated in the figures is only illustrative as other shapes and a greater or less number of tubes may be possible without deviating from the spirit and scope of the disclosed inventive concept.

Figure 2:
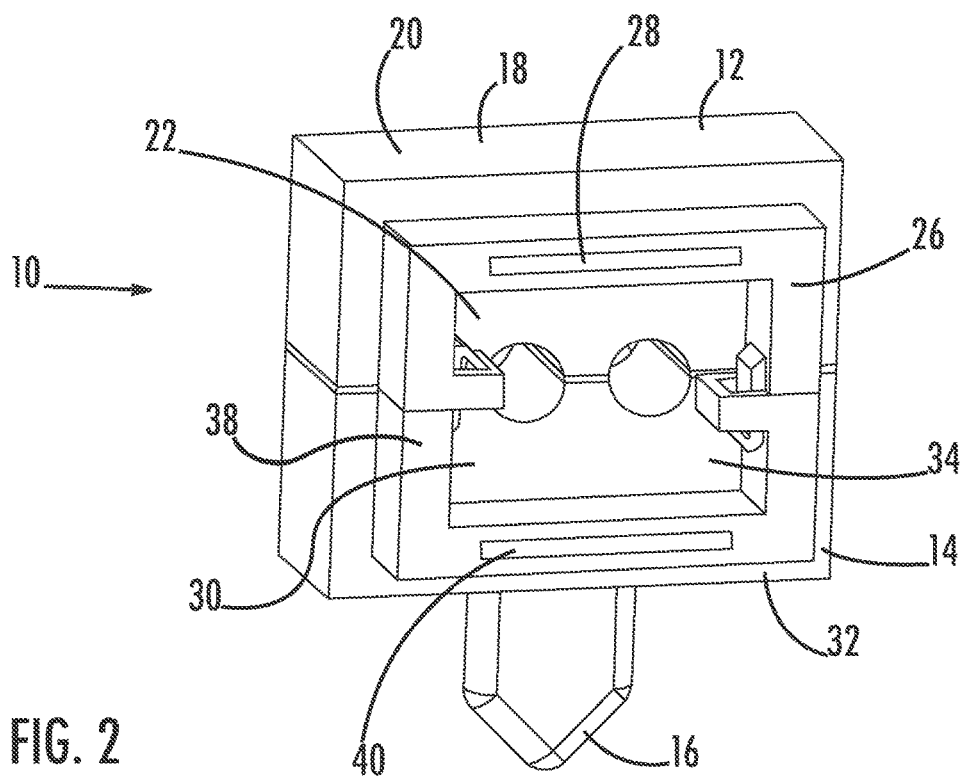
FIG. 2 is a perspective view of a support clip according to the disclosed inventive concept in which the two halves are clamped together.
Figure 3:
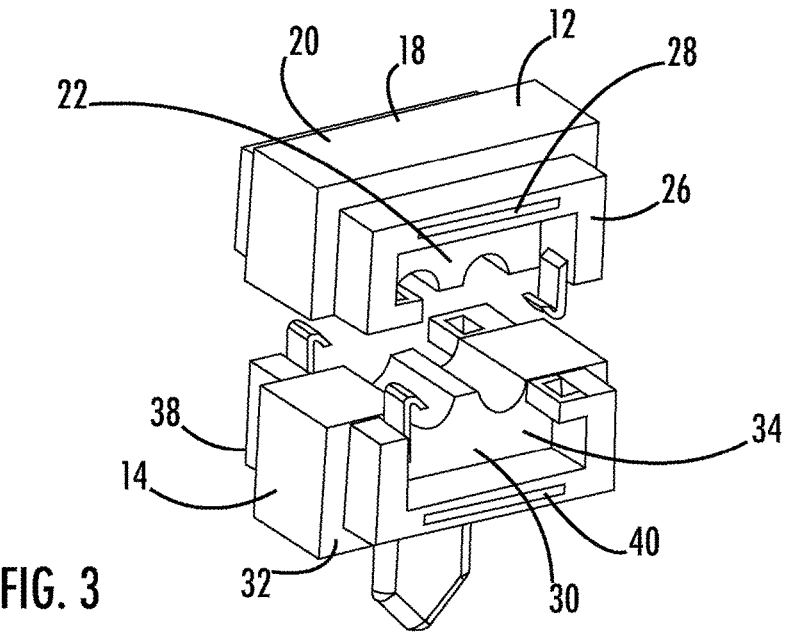
FIG. 3 is a perspective view of a support clip according to the disclosed inventive concept in which the two halves are shown in spaced-apart relation to one another.
Figures 4A, 4B:
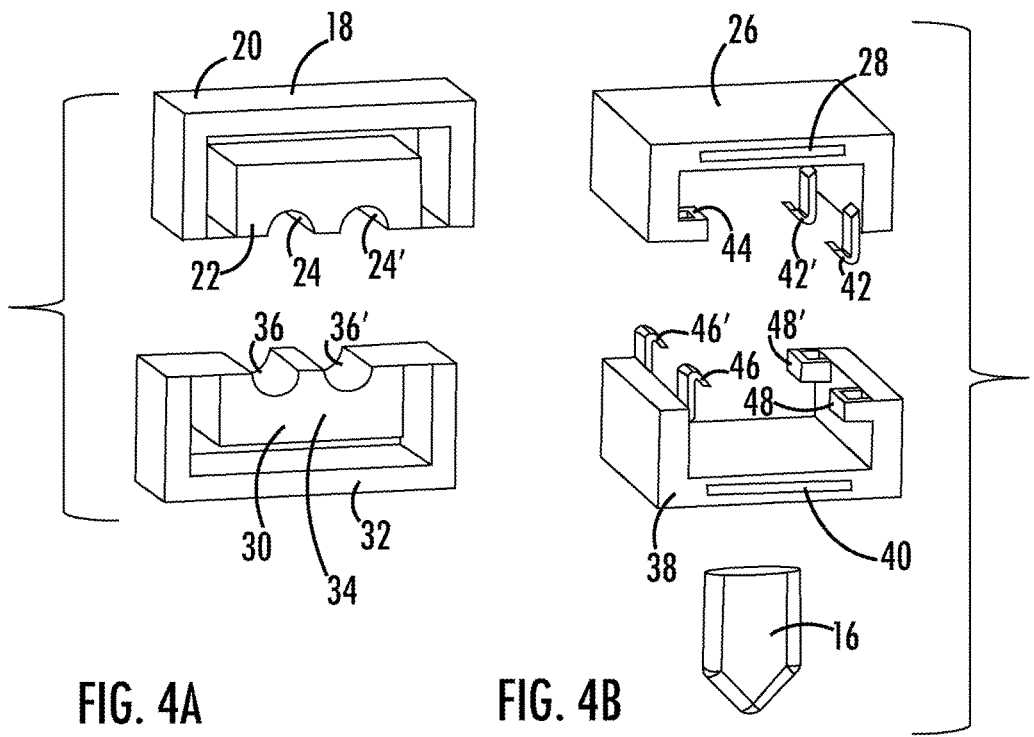
FIG. 4A is a perspective view of the elastomeric portions of the support clip according to the disclosed inventive concept in which the portions are shown in spaced-apart relation to one another.
FIG. 4B is a perspective view of the rigid portions of the support clip according to the disclosed inventive concept in which the portions are shown in spaced-apart relation to one another.
Figure 5:
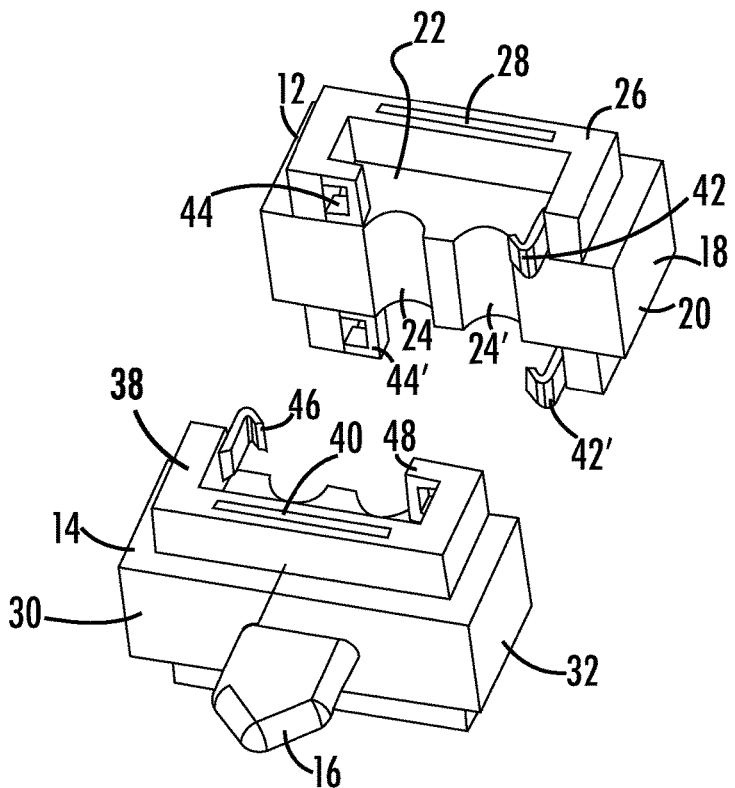
FIG. 5 is a perspective view of a support clip according to the disclosed inventive concept in which the two halves are separated viewed from an angle different from that of FIG. 3.

Referring to FIGS. 1 and 2, a support clip according to the disclosed inventive concept is illustrated in its closed position and is generally illustrated as 10. The support clip 10 includes an upper portion 12 and a lower portion 14. The upper portion 12 generally but not necessarily defines an upper half while the lower portion 14 generally but not necessarily defines a lower half. An attaching or locating anchor 16 is formed as part of the lower portion 14 and extends from the underside of the lower portion 14. The locating anchor 16 is used to attach the support clip 10 to any of several substrates located on an automotive vehicle (not shown) that include, without limitation, inner wheel wells, engine compartment surfaces, and the vehicle frame.

The upper portion 12 includes an upper elastomeric seal 18. The upper elastomeric seal 18 may be made of any of several materials including, without limitation, natural and synthetic rubber and certain soft plastics and polyurethanes. The upper elastomeric seal 18 includes an outer portion 20 and an inner portion 22.

As noted above, one or more fluid-carrying tubes may be secured by the support clip 10 of the disclosed inventive concept. According to the illustrated embodiment, two fluid-carrying tubes may be attached by the support clip 10. Particularly, a first channel upper half 24 and a second channel upper half 24' are formed in the inner portion 22 of the upper elastomeric seal 18.

Because the upper elastomeric seal 18 is relatively pliable as necessary to provide a proper seal around the supported tubes, it requires a relatively rigid structure to maintain its shape. This structure is provided by a rigid body upper half 26 that is formed from any of several materials, including without limitation, a rigid plastic material. It may be desirable to include additional protection for the constrained tube and such protection may be provided by the addition of a metal insert 28. The metal insert 28 may be composed of any of several materials, including without limitation, flat steel.

The lower portion 14 includes a lower elastomeric seal 30. Like the upper elastomeric seal 18, the lower elastomeric seal 30 may be made of any of several materials including, without limitation, natural and synthetic rubber and certain soft plastics and polyurethanes. The lower elastomeric seal 30 includes an outer portion 32 and an inner portion 34. A first channel lower half 36 and a second channel lower half 36' are formed in the inner portion 34 of the lower elastomeric seal 30. When the upper portion 12 and the lower portion 14 are assembled as illustrated in FIGS. 1 and 2, the first channel upper half 24 of the inner portion 22 opposes the first channel lower half 36 of the inner portion 34 while the second channel upper half 24' of the inner portion 22 opposes the second channel lower half 36' of the inner portion 34.

As is the case with the elastomeric seal 18 of the upper portion 12, because of its sealing properties, the elastomeric seal 30 of the lower portion 14 is relatively pliable and thus requires a relatively rigid structure to maintain its shape. This structure is provided by a rigid body lower half 38 that, like the rigid body upper half 26, is formed from any of several materials, including, without limitation, a rigid plastic material. Also as in the case with the upper portion 12, it may be desirable to include additional protection for the constrained tube and such protection may be provided by the addition of a metal insert 40 that may be composed of any of several materials, including without limitation, flat steel.

The upper portion 12 and the lower portion 14 are illustrated in FIGS. 1 and 2 as being attached to one another. Attachment of the upper portion 12 to the lower portion 14 may be made by any of several possible methods. One such method is illustrated in the figures and which is more clearly shown in FIGS. 3, 4A, 4B and 5 in which exploded views of the support clip 10 are shown. Referring to these figures, spaced apart upper clasps 42 and 42' are integrally formed with the rigid body upper half 26 and extend therefrom. Spaced apart upper clasp receivers 44 and 44' are also integrally formed with the rigid body upper half 26 and extend therefrom. In a similar manner, spaced apart lower clasps 46 and 46' are integrally formed with the rigid lower half 38 and extend therefrom. Spaced apart lower clasp receivers 48 and 48' are also integrally formed with the rigid body lower half 38 and extend therefrom. The upper clasp receivers 44 and 44' receive and engage the lower clasps 46 and 46' respectively while the lower clasp receivers 48 and 48' receive and engage the upper clasps 42 and 42' when the upper portion 12 is pressed against the lower portion 14 which is itself attached to a substrate (not shown) by the locating anchor 16.

Other methods of attaching the upper portion 12 to the lower portion 14 may be employed, such as the use of alternative clasps or mechanical fasteners. In addition, it is to be understood that while the upper portion 12 is formed separate from the lower portion 14, it may be possible for the upper portion 12 to be hingedly attached to the lower portion 14 along one end. An interference fit is created between the upper portion 12 and the lower portion 14.

In use, the lower portion 14 of the support clip 10 is selectively attached to a strategic location of a substrate (not shown) by insertion of the locating anchor 16 into an appropriate aperture formed in the substrate. Once attached, and as illustrated in FIG. 6, one or more fluid-carrying tubes or lines such as fluid-carrying tubes 50 and 50' are generally positioned by the installer above and then into the first channel lower half 36 and the second channel lower half 36' respectively. Thereafter, the installer places the upper portion 12 above and in alignment with the lower portion 14 and, subsequently, attaches the upper portion 12 to the lower portion 14 and locks the upper portion 12 in place against the lower portion 14 by the upper clasp receivers 44 and 44' receiving and engaging the lower clasps 46 and 46' and the lower clasp receivers 48 and 48' receiving and engaging the upper clasps 42 and 42' as illustrated in FIG. 7.

Once the upper portion 12 is attached to the lower portion 14, an air tight seal is formed at the interface between the fluid-carrying tube 50 and the first channel upper half 24 and the first channel lower half 36 and between the fluid-carrying tube 50' and the second channel upper half 24' and the second channel lower half 36. In this manner, the support clip 10 accounts for minor surface-to-surface variations while maintaining the air tight seal.

Thus, the disclosed invention as set forth above overcomes the challenges faced by known approaches to attaching fluid-carrying tubes or lines to different vehicle substrates in such a way that the tubes or lines are protected from damage during the installation process and when in use while achieving an air tight seal. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A support clip for attaching a fluid-carrying tube to a substrate comprising:
   a lower portion having a lower rigid body and a lower elastomeric portion having an inner portion and an outer portion, a lower tube-holding channel being formed in said inner portion, a substantial portion of said lower rigid body being positioned between said inner portion and said outer portion; and
   an upper portion having an upper rigid body and an upper elastomeric portion having an upper tube-holding channel, said upper portion being lockingly attachable to said lower portion,
   wherein the tube is held between said tube-holding channels when said upper portion is attached to said lower portion.

2. The support clip for attaching a fluid-carrying tube to a substrate of claim 1, further including a locating anchor fixed to said lower portion.

3. The support clip for attaching a fluid-carrying tube to a substrate of claim 1, further including a metal insert attached to at least one of said rigid bodies.

4. The support clip for attaching a fluid-carrying tube to a substrate of claim 1, wherein said upper elastomeric portion includes an inner portion, an outer portion, and an upper gap provided between said inner portion and said outer portion, said upper tube-holding channel being formed in said inner portion, a substantial portion of said upper rigid body being positioned within said upper gap.

5. The support clip for attaching a fluid-carrying tube to a substrate of claim 1, including a mechanical fastener for attaching said upper portion to said lower portion.

6. The support clip for attaching a fluid-carrying tube to a substrate of claim 5, wherein said mechanical fastener includes a clasp formed on one or the other of said upper portion and said lower portion and a clasp receptacle formed on the other of said upper portion and said lower portion.

7. A support clip for attaching a fluid-carrying tube to a substrate comprising:
   a lower portion including a lower elastomeric portion and a lower rigid body, said lower elastomeric portion including a lower tube-holding channel, said lower rigid body including an anchor extending through said lower elastomeric portion; and
   an upper portion attachable to said lower portion, said upper portion including an upper rigid body and an upper elastomeric portion with an upper tube-holding channel formed therein,
   wherein the tube is held between said tube-holding channels when said upper portion is attached to said lower portion.

8. The support clip for attaching a fluid-carrying tube to a substrate of claim 7, further including a metal insert attached to at least one of said rigid bodies.

9. The support clip for attaching a fluid-carrying tube to a substrate of claim 7, wherein said lower elastomeric portion includes an inner portion and an outer portion and wherein a substantial portion of said lower rigid body is fitted therebetween.

10. The support clip for attaching a fluid-carrying tube to a substrate of claim 7, wherein said upper elastomeric portion includes an inner portion and an outer portion and wherein a substantial portion of said upper rigid body is fitted therebetween.

11. The support clip for attaching a fluid-carrying tube to a substrate of claim 7, including a mechanical fastener for attaching said upper portion to said lower portion.

12. The support clip for attaching a fluid-carrying tube to a substrate of claim 11, wherein said mechanical fastener includes a clasp formed on one or the other of said upper portion and said lower portion and a clasp receptacle formed on the other of said upper portion and said lower portion.

13. A support clip for attaching a fluid-carrying tube to a substrate comprising:
   a first fluid seal including a first rigid body having an outer perimeter and a first elastomeric portion having a half-moon shaped channel formed therein, said first elastomeric portion encircling said outer perimeter of said first rigid body;
   a second fluid seal having a half-moon shaped channel formed therein, said channel of said first fluid seal being positionable over said channel of said second fluid seal thereby forming a fluid-carrying tube passage therebetween; and
   a fastener for attaching said first fluid seal to said second fluid seal.

14. The support clip for attaching a fluid-carrying tube to a substrate of claim 13, further including a locating anchor fixed to one of said fluid seals.

15. The support clip for attaching a fluid-carrying tube to a substrate of claim 13, further including a metal insert attached to at least one of said fluid seals.

16. The support clip for attaching a fluid-carrying tube to a substrate of claim 13, wherein said a first elastomeric portion has an inner portion and an outer portion and wherein a substantial portion of said first rigid body is fitted therebetween.

17. The support clip for attaching a fluid-carrying tube to a substrate of claim 13, wherein said second fluid seal includes a second rigid body and a second elastomeric portion having an inner and an outer portion and wherein a substantial portion of said second rigid body is fitted therebetween.

18. The support clip for attaching a fluid-carrying tube to a substrate of claim 13, wherein said fastener includes a clasp formed on one of said fluid seals and a clasp receptacle formed on the other of said fluid seals.

* * * * *